3,560,408
CATALYTIC MINERAL FIBERS AND THEIR PREPARATION

Jean-Pierre Kiehl and Gabriel Pupier, Lyon, France, assignors to Societe Generale des Produits Refractaires, Paris, France
No Drawing. Filed Apr. 10, 1968, Ser. No. 720,324
Claims priority, application France, Apr. 10, 1967, 102,802
Int. Cl. B01j *11/06, 11/32*
U.S. Cl. 252—463                                    5 Claims

ABSTRACT OF THE DISCLOSURE

A catalytic mineral fiber containing at least 70 percent alumina, less than 20 percent of at least one catalyst distributed within the crystalline lattice or between the oxide crystals, and containing less than 30 percent other refractory oxides and less than 5 percent recrystallization inhibitors, and having a specific B.E.T. surface at least equal to 70 m.$^2$/g. and stable up to at least 1050° C. The fiber is produced by the preparation of a solution in water of aluminum oxychloride and a hydrolyzable salt of a catalytic element along with recrystallization inhibitors. The solution has an adjusted pH between 3 and 5 and a viscosity acceptable to extrusion, drawing, etc., to form fibers that are converted into insoluble oxides in an atmosphere of steam at a temperature varied according to pressure.

---

Our invention relates to catalytic mineral fibers and their preparation and, more particularly, to the preparation of such fibers having a high specific B.E.T. surface and remaining stable at very high temperatures.

The use of either natural or synthetic mineral fibers as catalytic carriers is well-known. Asbestos, either in the form of cloth or wadding treated with a catalytic solution, has been used for the catalytic combustion of gasses and liquid hydrocarbons. However, these fibers have not been entirely satisfactory. They become dehydrated between 400 and 600° C. and become brittle, which, under the slightest mechanical impact, causes their deterioration.

Synthetic mineral fibers, on the other hand, such as kaolin wools, are more heat resistant than asbestos fibers. Although they have the advantage of being heat resistant, these wholly vitreous fibers are substantially nonporous and, therefore, have a specific B.E.T. surface of only a square meter per gram or so. Accordingly, the catalysts do not adhere well to the surface and are quickly entrained by the products with which the fibers are in contact. Moreover, the catalysts deposited on these fibers in some cases react with the vitreous mass and progressively lose their activity by poisoning.

We have been able to overcome many of the aforementioned disadvantages by our improved catalytic fibers. Our catalytic fibers contain at least 70 percent and preferably at least 95 percent alumina; less than 20 percent and preferably less than 5 percent of the fiber is made of at least one catalyst distributed within the mass of each fiber at the joints of the oxide crystals and/or syncrystallized in the crystalline lattice itself. Preferably, our fibers contain less than 5 percent refractory oxieds other than alumina, for example, $SiO_2$, $CaO$, and $ZrO_2$, but can have up to 30 percent. Furthermore, our fibers contain less than 5 percent and preferably less than 2 percent recrystallization inhibitors. The fibers have a specific B.E.T. surface of at least 70 m.$^2$/g. and remain stable up to temperatures of approximately 1050° C.

The microcrystals of alumina in these fibers are preferably in the alpha and eta form. These fibers are both pliable and strong and insoluble in either water or strong acids. They have a diameter normally between 2 and 40 microns with a length between 1 and 200 millimeters. More importantly, they are characterized by the fact that catalysts form part of the fiber itself. Accordingly, the fibers have a double catalytic action: (1) conventional surface catalytic action, and (2) catalytic action by diffusion through the crystals. This double catalytic action greatly enhances the catalytic activity of the fiber, and in some cases, permits the proportion of catalyst to be low without the impairment of catalytic action, which is extremely important where the catalyst is expensive.

Furthermore, the area of geometrical surface contains a greater effective proportion of catalyst than conventional carriers, such as spheroids of active alumina. This permits an increased use of catalysts having relatively low activities.

Moreover, our catalyst is more durable because the catalyst is a part of the fiber itself. Particularly, this durability is due to the catalytic diffusion action which reduces the poisoning of the catalyst by impurities of the products processed. It is also due to the integration of the catalyst into the structures of the fiber, thereby preventing any physical or chemical entrainment of the catalyst by the products with which the fibers are in contact.

Since the fibers already contain catalyst within the mass, they may act as carrier substances for other catalyst or for reaction moderators deposited in the conventional manner. This is of particular interest if it is desired to have several different catalytic actions, and the conditions of activation of the different catalyst are relatively incompatible.

When our fibers contain 95 percent or more alumina, their specific B.E.T. surface is generally greater than 90 m.$^2$/g. and may even exceed 100 m.$^2$/g.

The process for the production of our novel fibers comprises the preparation of a solution in water of aluminum oxychloride and hydrolyzable salts of the catalytic element desired, preferably with hydrolyzable salts of other refractory oxides. To this solution are also added recrystallization inhibitors. The solution of oxychloride and salts is adjusted to a pH of between 3 and 5, and the viscosity is adapted to the production of fibers by such means as extrusion, drawing, spinning, blowing, consisting of aluminum oxychloride and of the other salts of solution. These fibers are partially dried and processed in an atmosphere of steam at a temperature that varies according to the pressure; for example, at atmospheric pressure, the temperature will lie between 200 and 400° C. and preferably between 300 and 360° C. During the processing, the fibers generally undergo a linear shrinkage on the order of 20 to 30 percent and are converted into fibers of active alumina and other initial refractory oxides containing the catalyst. These fibers are capable of retaining up to 10 percent absorbed water. Moreover, the catalytic fibers have a specific surface exceeding 70 m.$^2$/g. It is possible to increase the specific surface by a subsequent complete dehydration in a completely dry atmosphere between 400 and 600° C. If the catalyst is not in its most active form at this stage, then the fibers are exposed to a heat treatment in a specific atmosphere; for example, an oxidizing, neutral, or reducing atmosphere, which may be chlorinated, fluorinated, or ammoniated, at the temperature required for activation.

Generally, the catalysts to be introduced into the active fibers are elements such as platinum, nickel, cobalt, iron, cerium, in a proportion that may be between a few parts per million to approximately 20 percent, but preferably less than 5 percent the weight of the fibers. These catalysts are usually introduced into the initial composition in the form of soluble salts, such as chloride, nitrates, sulfates or acetates.

Recrystallization inhibitors improve the thermic stability of the fibers having very large specific surfaces. The inhibitors may be introduced into the initial composition in the form of cations, such as $Ca^{++}$, $Mg^{++}$, $Zr^{++}$, or anions, such as $SO_4^{--}$, $SiO_3^{--}$, $Bo_2^-$, in a proportion lower than 5 percent and, preferably lower than 2 percent, the weight of the fibers.

The following nonlimiting example deals with catalytic fibers having a very high aluminum content and free of silicon and other more reducible compounds. These fibers are intended to catalyze the after-combustion of carbon monoxide in the exhaust gases of internal combustion engines and that of noncombusted elements in the fumes of combustion apparatuses.

We take a commercial solution of pure aluminum oxychloride with a density of 1.33 and a ratio of $$\frac{Al}{Cl} = 1.3$$

This solution is brought to a pH of 3 to 5 by an addition of acetic acid. Then, as a recrystallization inhibitor, lime is added in the form of calcium acetate in order to obtain a ratio of $$\frac{CaO}{Al_2O_3} = 0.02$$

and, as a catalyst, platinum is added in the form of platinum chloride in order to obtain the ratio of $$\frac{Pt}{Al_2O_3} = 0.001$$

The solution thus obtained is concentrated by evaporation at 60 to 80° C. to a viscosity of 80 poises, measurement being made at 20° C. This solution, reheated to 30° C., is then centrifuged at 3,500 r.p.m. through 0.6 mm. orifices. The obtained fibers have a diameter of 10 to 15 microns and are 150 mm. in length. They are collected by suction on a grate moving in front of a blower and are then dried at 80° C. for 12 hours. At the end of this treatment their total content in volatile elements is about 45 percent. The layers of fibers are then introduced directly into a stream of water vapor at 350° C. under atmospheric pressure. This treatment lasts 12 hours. In the course of the treatment the fiber shrinkage is about 25 percent. After cooling, the obtained fibers are transparent, clear grey in color, insoluble in water and common acids, free of chlorine, and have a specific surface of 90 m.$^2$/g. Basically, they are formed of alpha and eta alumina crystals. The presence of eta alumina is a favorable factor for maintaining a large specific surface even at elevated temperatures, which is not the case in the gamma form which is rapidly transformed in $\alpha$ alumina from 500° C. on.

The platinum of the fibers thus obtained is activated by a thermic treatment of dry air for several minutes at 600° C., which simultaneously causes dehydration of the fibers. This dehydration brings their specific surface B.E.T. to 110 m.$^2$/g.

The activity of these catalytic fibers in the exhaust gases of a gasoline engine containing 1 percent CO is about 95 percent at a temperature of 400° C. and for a spatial hourly speed of 40,000 (that is to say, that in one hour a gas volume of 40,000 Nm.$^3$ (standard cubic meters) passes over 1 m.$^3$ of catalytic carrier). This activity remained constant after 50 hours despite the presence of tetraethyl lead in the fuel which quickly poisons platinum catalysts deposited on conventional carriers. The properties of these fibers were retained when used at temperatures as high as 1050 to 1100° C. Accordingly, the catalytic fibers are advantageous in many chemical reactions, such as cracking, reduction, and catalytic synthesis.

While we have described preferred embodiments of our invention, it may otherwise be embodied within the scope of the appended claims.

We claim:
1. A process for the preparation of catalytic mineral fibers having a catalyst integrated into the structure of the fiber stable to at least 1051° C. and having a surface B.E.T. of a least 70 m.$^2$/g. comprising steps for:
   (a) preparing a solution in water comprising aluminum oxychloride, at least one of hydrolyzable salts of at least one catalyst;
   (b) adjusting the pH of said solution to between 3 and 5;
   (c) forming fibers from said solution after adjusting the solution viscosity for a process selected from the group consisting of extrusion, drawing, spinning and blowing;
   (d) partially drying said fibers;
   (e) treating said partially dried fibers in steam vapors between about 200° C. and 400° C. to form water and strong acid insoluble, chlorine-free fibers; and
   (f) recovering a catalytic mineral fiber analyzing at least 70 percent alumina and an effective amount up to 20 percent of at least one catalyst.
2. A process as set forth in claim 1 wherein said stream process is carried out at atmospheric pressure and between 200 and 400° C.
3. A process as set forth in claim 1 wherein the fibers are completely dehydrated in a dry atmosphere of 400 to 600° C.
4. A process as set forth in claim 3 wherein said dry atmosphere is oxidizing.
5. A process as set forth in claim 3, wherein said dry atmosphere is reducing.

References Cited

UNITED STATES PATENTS

| | | | |
|---|---|---|---|
| 3,151,940 | 10/1964 | Kehl | 23—143 |
| 2,809,170 | 10/1957 | Cornelius | 252—465 |
| 3,367,888 | 2/1968 | Hoekstra | 252—466 |
| 3,230,034 | 1/1966 | Stiles | 252—477X |
| 3,317,439 | 5/1967 | Stiles | 252—477X |
| 3,291,564 | 12/1966 | Kearby | 252—463 |
| 3,304,150 | 2/1967 | Stover | 23—2.2X |
| 3,378,334 | 4/1968 | Bloch | 23—2.2X |
| 1,942,799 | 1/1934 | Brewer | 23—143 |
| 3,409,390 | 11/1968 | Hoekstra | 23—2.2X |
| 2,698,305 | 12/1954 | Plank | 252—454 |
| 2,982,719 | 5/1961 | Gilbert | 208—120 |

DANIEL E. WYMAN, Primary Examiner

P. M. FRENCH, Assistant Examiner

U.S. Cl. X.R.

23—143; 252—462, 466